(12) United States Patent
Tsuda et al.

(10) Patent No.: US 6,445,534 B1
(45) Date of Patent: Sep. 3, 2002

(54) DISK DRIVE APPARATUS AND HARD DISK DRIVE

(75) Inventors: Shingo Tsuda, Yokohama; Kiyoshi Satoh, Fujisawa, both of (JP)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 09/677,965

(22) Filed: Oct. 3, 2000

(30) Foreign Application Priority Data

Oct. 22, 1999 (JP) ............................................ 11-300603

(51) Int. Cl.[7] ...................... G11B 33/12; G11B 25/04; G11B 19/20; G11B 21/02
(52) U.S. Cl. ................................................ 360/97.01
(58) Field of Search .......................... 360/97.01, 265.7, 360/265.8; 369/75.1

(56) References Cited

U.S. PATENT DOCUMENTS 5,315,466 A * 5/1994 Nishimoto et al. ......... 360/106
6,122,138 A * 9/2000 Khanna et al. ........... 360/97.01
6,236,533 B1 * 5/2001 Forbord et al. .......... 360/98.01

FOREIGN PATENT DOCUMENTS

| JP | 03-108178 | 5/1991 |
| JP | 05-325530 | 12/1993 |
| JP | 06-020440 | 1/1994 |
| JP | 11-195282 | 7/1999 |

* cited by examiner

Primary Examiner—William Klimowicz
(74) Attorney, Agent, or Firm—Robert B. Martin; Bracewell & Patterson, L.L.P.

(57) ABSTRACT

A hard disk drive that can suppress an increase of fluttering and power consumption at high rotation speed by increasing the seek speed of a magnetic head is disclosed. An enclosure case has a 3.5 inch form factor, and a magnetic disk has an outer diameter of, for example, 84 mm. A center of the magnetic disk is shifted from a center of the enclosure case in the width direction. Owing to this, by designing a larger voice coil, it is possible to increase the driving speed of the actuator.

5 Claims, 6 Drawing Sheets

DISK DRIVE APPARATUS AND HARD DISK DRIVE

BACKGROUND OF THE INVENTION

1. Technical Field

The present invention relates to a disk drive apparatus used as a data recording means in a computer and, in particular, to a disk drive apparatus that can increase speed when a magnetic head seeks a track of interest.

2. Description of the Related Art

Hard disk drives are commonly used as data recording means in a computer having a structure with one or more coaxial magnetic disks that are driven by a spindle motor. A magnetic head faces the magnetic disks to read and write data, and this magnetic head is driven by an actuator, generally speaking, a Voice Coil Motor. The magnetic disk, magnetic head, and actuator are contained in an enclosure called an enclosure case. A major technical task in the field of hard disk drives is to increase storage capacity per sheet of magnetic disk and to increase the speed of reading data from and writing data into the magnetic disk.

SUMMARY OF THE INVENTION

The performance of a voice coil motor is enhanced by thickening a permanent magnet constituting the voice coil motor, but there is a limit presently. Then, the present inventor et al. paid attention to the increase of driving speed by enlarging the torque generated in a voice coil through elongating the distance between a rotation center of the voice coil and an end portion of the voice coil. FIG. 3 shows an actuator 26 including a voice coil 32. In order to elongate the distance between the rotation center and end portion of the voice coil 32 (hereinafter, L), it is necessary to ensure a space for the purpose in the enclosure case.

Nevertheless, it is not easy in a current Hard Disk Drive to secure such a space in the enclosure case. This is because parts such as the magnetic disk, and Voice Coil Motor are arranged in the enclosure case in high density. In a conventional Hard Disk Drive, a magnetic disk is arranged so that a center of the magnetic disk coincides with a center of the enclosure case in the direction of width.

Against this, in the present invention, a magnetic disk is arranged so that a center of the magnetic disk is shifted from a center of the enclosure case in the direction of width. Therefore, the space for elongating the distance L is secured by enlarging an area of any one of left and right spaces in the enclosure case with making the center of the disk-like recording medium as a boundary.

Thus the present invention is a disk drive apparatus, comprising: a disk-like recording medium that can be randomly accessed; a magnetic head to record or reproduce a signal, the magnetic head being provided opposite to the disk-like recording medium; an actuator to seek the magnetic head above the disk-like recording medium; and an enclosure to contain the disk-like recording medium, the magnetic head, and the actuator, the enclosure being configured so that one area to contain the disk-like recording medium is larger than another area to contain the disk-like recording medium, the areas being set on a center line of the disk-like recording medium as a boundary in the direction of width.

In the present invention, it is effective to make dimensions of the disk-like recording medium smaller than those of a disk-like recording medium corresponding to a form factor of the enclosure. Thus, by reducing a diameter of the disk-like recording medium, it becomes possible to shift the disk-like recording medium from the enclosure. In addition, as is well known, the form factor denotes the width of an enclosure, that is, an enclosure case, constituting a Hard Disk Drive. Usually, if the form factor is 3.5 inches, a disk-like recording medium having the diameter of 3.5 inches (generally, 95 mm) corresponds to this.

Nevertheless, in the present invention, a disk-like recording medium having the diameter smaller than this is mounted. This means that the dimensions of the disk-like recording medium is smaller than those of the disk-like recording medium corresponding to the form factor of the enclosure. In addition, in case it is expressed that the diameter of a magnetic disk is reduced, this expression means this.

Furthermore, in the present invention, it is possible to diagonally arrange the disk-like recording medium and actuator in the enclosure and arrange the actuator in the side having the larger accommodation area. Owing to such arrangement, it becomes possible to enlarge the dimensions of the actuator, more concretely, to elongate the distance L of the Voice Coil Motor. Therefore, the performance of the actuator is enhanced, and hence it is possible to increase the seek speed of the magnetic head.

In addition, the meaning of the fact that the actuator is arranged in the side having the larger accommodation area is not that the entire actuator exists in the side having the larger accommodation area, but that, at least, a drive shaft of the actuator is positioned in the side having the larger accommodation area.

In addition, the present invention provides a Hard Disk Drive, comprising: a magnetic disk to record data thereon; a head to read or write data from or to the magnetic disk; a Voice Coil Motor to drive the head; and an enclosure case to contain the magnetic disk, the head, and the Voice Coil Motor, the enclosure case having a 3.5 inch form factor, and the magnetic disk being arranged so that a center of the magnetic disk is arranged to be shifted from a center of the enclosure case in the direction of width, and an outer diameter of the magnetic disk being 84±0.1 mm (millimeter).

In this disk drive apparatus, the form factor of the enclosure case is 3.5 inches, but the outer diameter of the magnetic disk is 84±0.1 mm. Thus, although the outer diameter of the 3.5 inch magnetic disk is 95 mm, this disk drive apparatus includes the magnetic disk having the diameter smaller by 11 mm than that of the 3.5 inch magnetic disk. Therefore, owing to the use of this magnetic disk, it is possible to generate a space for elongating the distance L of the Voice Coil Motor by arranging the magnetic disk with shifting the center of the magnetic disk from the center of the enclosure case in the direction of width. In addition, since the diameter of the magnetic disk is reduced to 84±0.1 mm, it is possible to suppress the fluttering of the magnetic disk that is smaller than that of the 3.5 inch magnetic disk, even if the magnetic disk is rotated at the high rotation speed of, for example, 10,000 rpm.

Furthermore, it is possible to decrease the power consumption. Therefore, in the present invention it has critical meaning for increasing the seek speed and reducing the fluttering and power consumption to make the magnetic disk in 84±0.1 mm diameter. Moreover, although, here, the 84 mm magnetic disk is exemplified, it goes without saying that it is allowed in the present invention to use a magnetic disk having the diameter smaller than this dimension.

In the present invention, it is possible to make the distance L between the rotation center of the Voice Coil Motor and the end portion of the voice coil at 34 to 37 mm. The larger this distance L is, the faster the driving speed of the Voice Coil Motor, that is, the seek speed of the magnetic head can be made. Nevertheless, as there is a limit of a space allowable in the enclosure case, the distance of 34 to 37 mm is positioned as the distance necessary for getting the seek speed highest in the range allowable in the enclosure case.

In the present invention, it is desirable to make the shift between the center of the magnetic disk and the center of the enclosure case in the direction of width, that is, eccentricity 1 to 5.5 mm. This is because it is impossible to sufficiently elongate the distance L at the eccentricity less than 1 mm, and on the other hand, it is impossible to keep sufficient rigidity due to thin side walls of the enclosure case at the eccentricity more than 5.5 mm. Hence the desirable eccentricity is 3 to 4 mm. In addition, in the present invention, by reducing the diameter of the magnetic disk, the magnetic disk becomes eccentric in the direction of the width of the enclosure case, that is, is shifted in any one of left and right sides. Nevertheless, in the present invention, this is not limited in the cross direction, but it is possible to be shifted in the longitudinal (depth) direction of the enclosure case.

In addition, the disk drive apparatus according to the present invention can realize not only the high-speed read/write with adapting to the disk drive apparatus having the high rotation speed such as 7,200 rpm, 10,000 rpm, or 12,000 rpm, but also the reduction of the fluttering and power consumption of the magnetic disk.

In a Hard Disk Drive, a magnetic disk and a Voice Coil Motor occupy a large rate in weight. It is desirable that the center of gravity of the Hard Disk Drive coincides with a center of the enclosure case. The present invention has such an effect that it is possible to make the center of gravity of the Hard Disk Drive get closer to the center of the enclosure case by eccentrically locating the magnetic disk, and locating the magnetic disk and Voice Coil Motor on a diagonal line of the enclosure case as much as possible. Therefore, the present invention provides a Hard Disk Drive, comprising: a magnetic disk to record data thereon; a head to read or write data from or to the magnetic disk; a Voice Coil Motor to drive the head; and an enclosure case to contain the magnetic disk, the head, and the Voice Coil Motor, wherein: the magnetic disk is arranged in an area of the enclosure case so that one area to contain the magnetic disk is larger than another area to contain the magnetic disk, the areas being set on a center line of the magnetic disk as a boundary in the direction of width; the magnetic disk and the Voice Coil Motor are arranged on a diagonal line of the enclosure case; and thereby a center of gravity of the Hard Disk Drive conforms to a center of a surface of the enclosure case or gets closer to the center of the surface of the enclosure case.

In the present invention, in order to make an accommodation area of any one of left and right spaces larger than that of another space with the center of the magnetic disk as a boundary, it is good enough to reduce the diameter of the magnetic disk. Thus, it is good enough to make the dimensions of the magnetic disk smaller than those of a magnetic disk corresponding to a form factor of the enclosure case.
Problems to be Solved by the Invention As for the latter, it is possible to increase the speed of reading data from and writing data into the magnetic disk by reducing the seek time of a magnetic head moving to a track of interest on the magnetic disk. It is possible to increase the seek speed of the magnetic head by enhancing the performance of a Voice Coil Motor since the magnetic head is driven by the Voice Coil Motor as described above. In order to enhance the performance of the Voice Coil Motor, it is sufficient only to change a permanent magnet, which constitutes the voice coil, to another magnet that has stronger magnetic property or to increase a magnetic field applied to the Voice Coil Motor by thickening the permanent magnet. Nevertheless, up to now, a permanent magnet having magnetic property exceeding that of the permanent magnet used in the Voice Coil Motor has not been found. In addition, there is a limit of thickening the permanent magnet in a Hard Disk Drive requested to be small-sized.

In addition, it is possible to increase the data read/write speed by accelerating the rotation speed of the magnetic disk. Therefore, 7,200-rpm, 10,000-rpm, and 12,000-rpm high-speed Hard Disk Drives have been cast in market. Nevertheless, the high-speed rotation of the magnetic disk increases not only fluttering of the magnetic disk, but also power consumption. The increase of the fluttering badly affects the accuracy of data read/write.

Then, a task of the present invention is to provide a disk drive apparatus that can increase the seek speed of a magnetic head. Furthermore, another task of the present invention is to provide a disk drive apparatus that not only can increase the seek speed of a magnetic head but also can suppress the increase of fluttering and power consumption at high rotation speed.
Advantages of the Invention As described above, according to the present invention, it is possible to increase the average seek time, and hence it is possible to accelerate data read/write speed. Furthermore, according to the present invention, it is possible to realize the reduction of the fluttering and power consumption of a magnetic disk. Moreover, the present invention has such an effect that it is possible to make the center of gravity coincide with or get closer to a center of an enclosure case and to make writing of servo tracks easy.

DESCRIPTION OF THE PREFERRED EMBODIMENT

Hereinafter, a Hard Disk Drive according to an embodiment of the present invention will be described with reference to the drawings.

Figure 1:
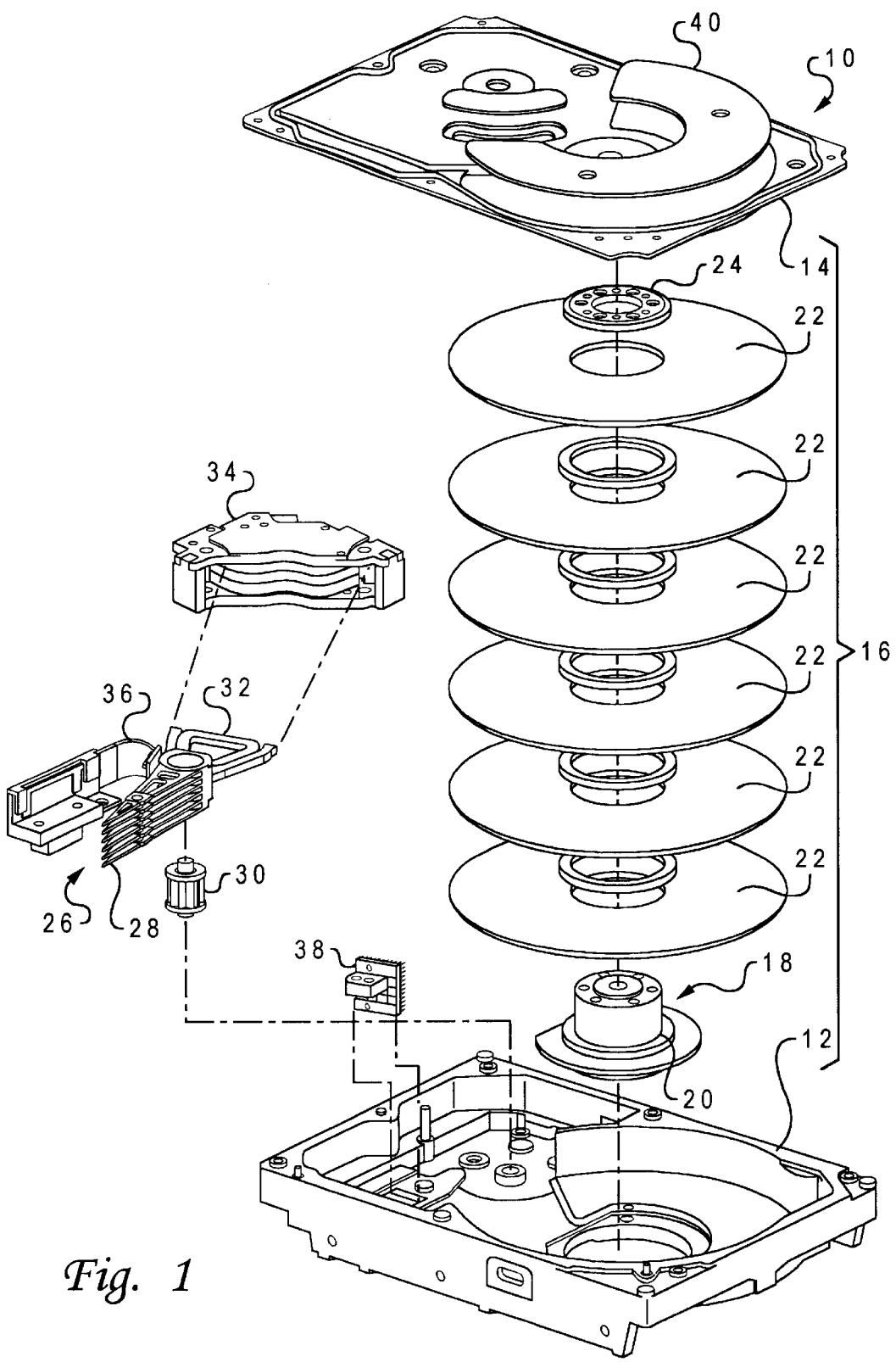
FIG. 1 is an exploded perspective view of a Hard Disk Drive according to the present embodiment.

As shown in FIG. 1, in a Hard Disk Drive 10 as a disk drive apparatus, an enclosure case 16 is constituted by a shallow-bottom type base 12 made of aluminum alloy, an open upper portion of which is closed by a cover 14. This enclosure case 16 has a rectangular shape and a shallow bottom, and hence, can be horizontally located in a computer or a keyboard.

The cover 14 made of brass is fixed to the base 12 with screws through a rectangular sealing member (not shown), and hence the enclosure case 16 is hermetically sealed. An acoustic plate 40 is located on an upper surface of the cover 14. The acoustic plate 40 is a member for preventing noise in the enclosure case 16 from leaking to the outside.

In this enclosure case 16, a spindle motor 18 having hub-in structure is provided at a space near the center of the base 12 toward the left end portion. On the upper surface of a hub 20 of this spindle motor 18, magnetic disks 22 made of glass substrates are fixed with a top clamp 24 with being coaxially stacked via spacers, and are rotatably driven by the spindle motor 18. In addition, this spindle motor 18 rotates at 10,000 rpm in rated operation.

In addition, in the enclosure case 16, an actuator 26 is provided. This actuator 26 has a magnetic head 28 in an end portion, and an intermediate portion of the actuator 26 is supported on the base 12 via a pivot 30 to be rotatable around the pivot 30. A voice coil 32 is provided at another end portion of the actuator 26 to constitute a Voice Coil Motor (VCM) with a VCM stator 34 provided in the enclosure case 16 for collaboration with this voice coil 32. The Voice Coil Motor rotates the actuator 26 with supplying current to the voice coil 32.

On the outer surface (lower side) of the base 12, a card (not shown) as a circuit board is attached, and this card has a rectangular shape and such dimensions that this card may cover the outer surface of the base 12. Inputs and outputs such as power and signals for driving the motor are performed between the card and spindle motor 18, and inputs and outputs such as power to the voice coil 32 and the power and signals for reading of the magnetic head 28 are performed between the card and actuator 26. The inputs and outputs between the card and actuator 26 are performed via a flexible cable (FPC) 36.

The Hard Disk Drive 10 according to the present embodiment is a disk drive apparatus called a head-load/unload type disk drive apparatus. This head-load/unload type disk drive apparatus unloads the magnetic head 28 at an evacuated position without the magnetic head 28 contacting to a surface of the magnetic disks 22 by making a ramp block 38 hold the actuator 26 when the disk drive apparatus is not operating. The magnetic head 28 is positioned above the magnetic disks 22 by the actuator 26 driving the magnetic head 28 when the disk drive apparatus operating.

Figure 2:
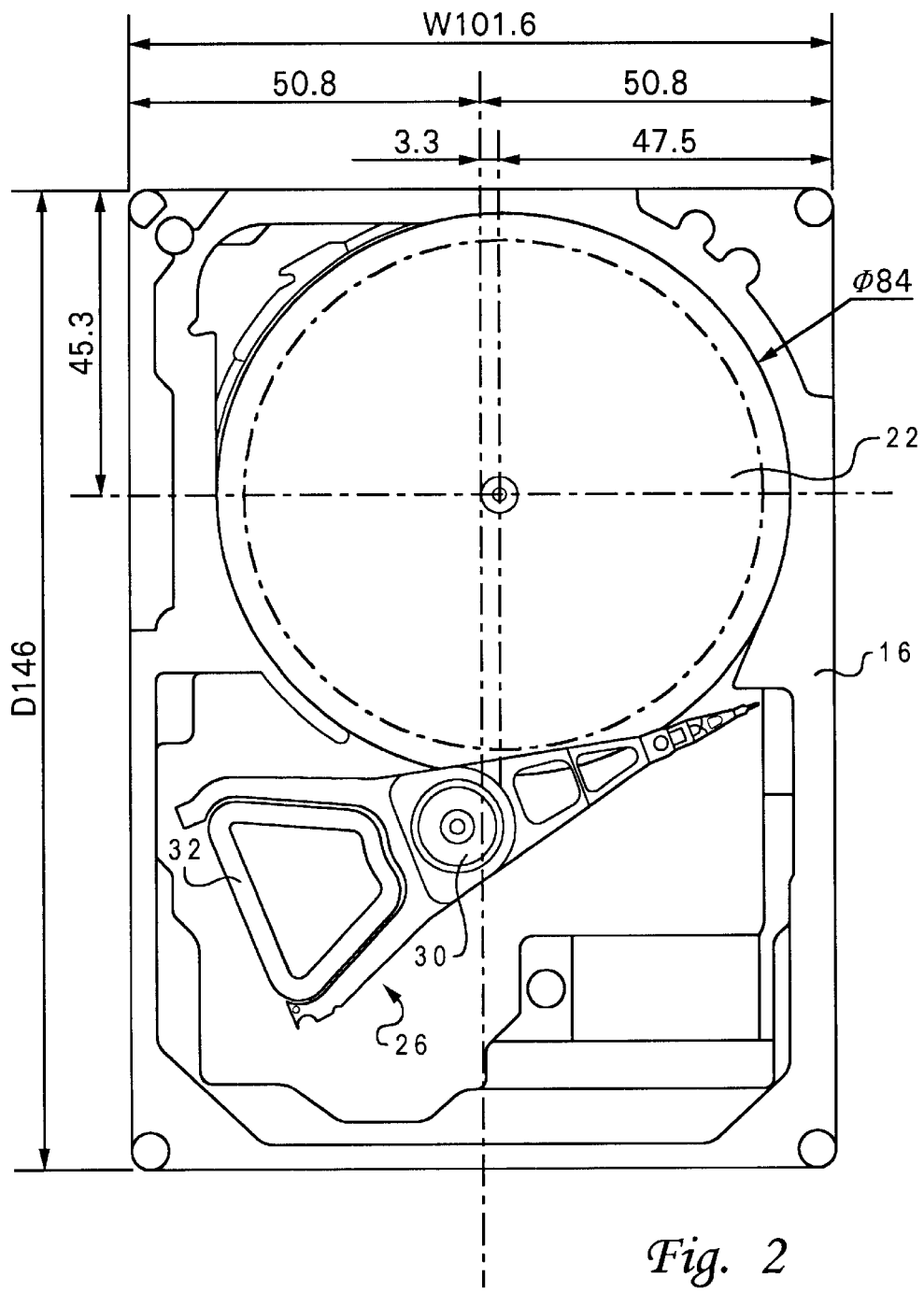
FIG. 2 is a top view of a Hard Disk Drive according to the present embodiment.

FIG. 2 shows a top view of the Hard Disk Drive 10 according to the present embodiment. Nevertheless, for easier comprehension, parts except the magnetic disks 22 and actuator 26 are omitted.

Figure 3:
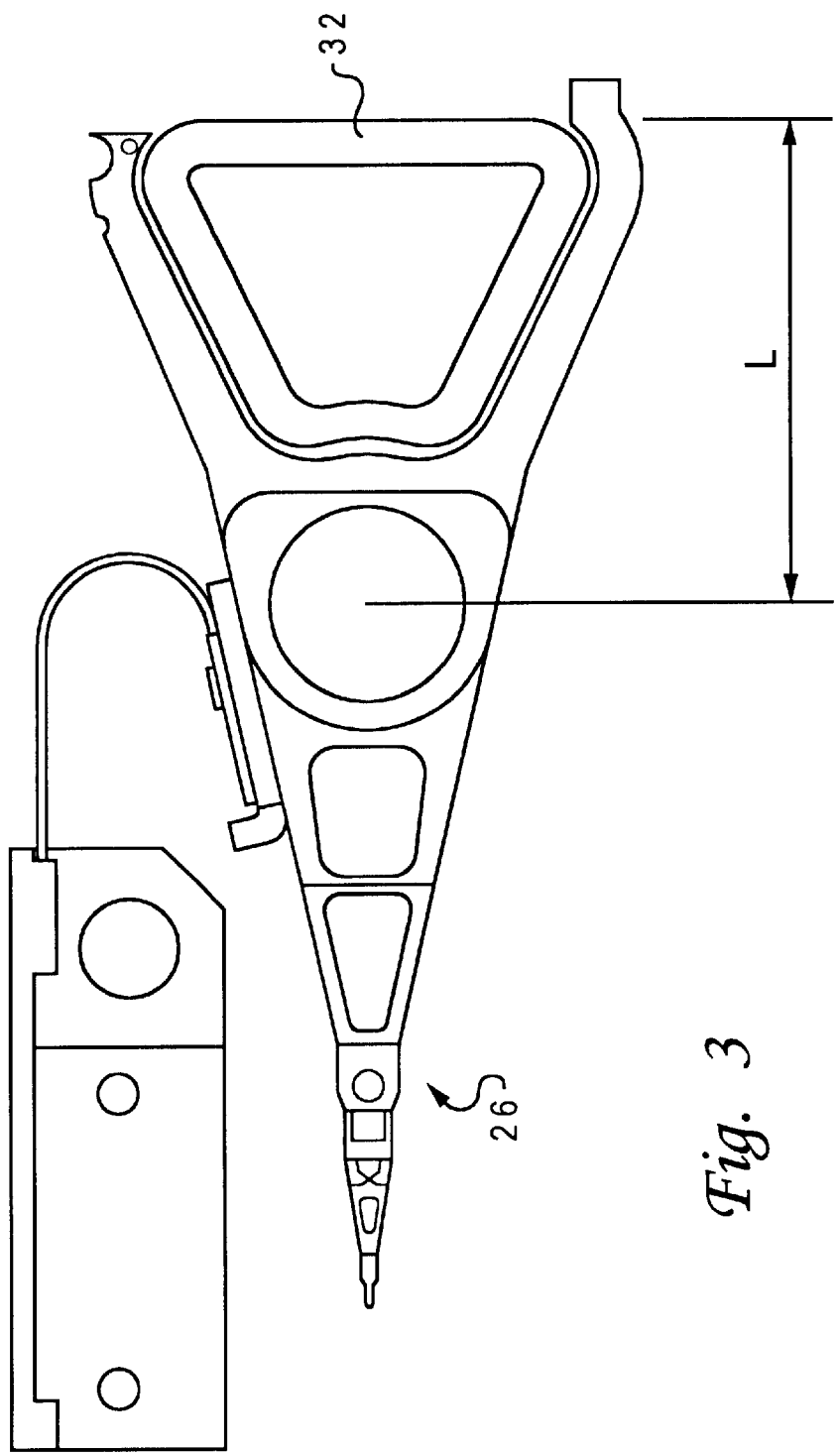
FIG. 3 is an enlarged drawing of an actuator 26 in a Hard Disk Drive according to the present embodiment.

As shown in FIG. 2, dimensions of the enclosure case 16 (base 12) of the Hard Disk Drive 10 according to the present embodiment are 101.6 W by 146 D by 25.4 H mm. This enclosure case 16 having the width of 101.6 mm corresponds to a 3.5 inch form factor. The magnetic disk 22 is made to have the diameter of 84 mm, and its center is positioned at the location shifted from the center of so; the enclosure case 16 by 3.3 mm in the direction of width. Therefore, since the width of the left space is 54.1 mm and the width of the right space is 47.5 mm with the center of the magnetic disk 22 as a boundary, the left space where the actuator 26 is located is wider than the right space. This means that it is possible to extend the dimensions of the actuator 26, more concretely, the distance from the shaft center (rotation center) of the pivot 30 to the farthest end portion of the voice coil 32 (L in FIG. 3).

In addition, although the eccentricity of the magnetic disk 22 is made 3.3 mm in the present embodiment, the disk drive apparatus according to the present invention is not limited to this. For example, in case the width of the enclosure case 16 corresponding to the 3.5 inch form factor is made 101.6 mm and the outer diameter of the magnetic disk 22 is 84 mm, the eccentricity of 5.5 mm at the maximum is possible. Thus, up to now, a 3.5 inch (outer diameter of 95 mm) magnetic disk 22 has been mounted in an enclosure case 16 having the 3.5 inch form factor.

Therefore, with considering that it is possible to move the magnetic disk having the outer diameter of 84 mm within the range where this 3.5 inch magnetic disk 22 is mounted, the maximum eccentricity is 5.5 mm because of (95–84)/2 mm. Within this range, it is possible to shift the magnetic disk 22, and on the other hand, if the eccentricity is small, the extent of enlarging the distance L between the shaft center of the pivot 30 and the farthest end portion of the voice coil 32 becomes small. Hence the eccentricity should be 1 mm or larger, desirably, is 3 mm or larger.

Figure 5B:
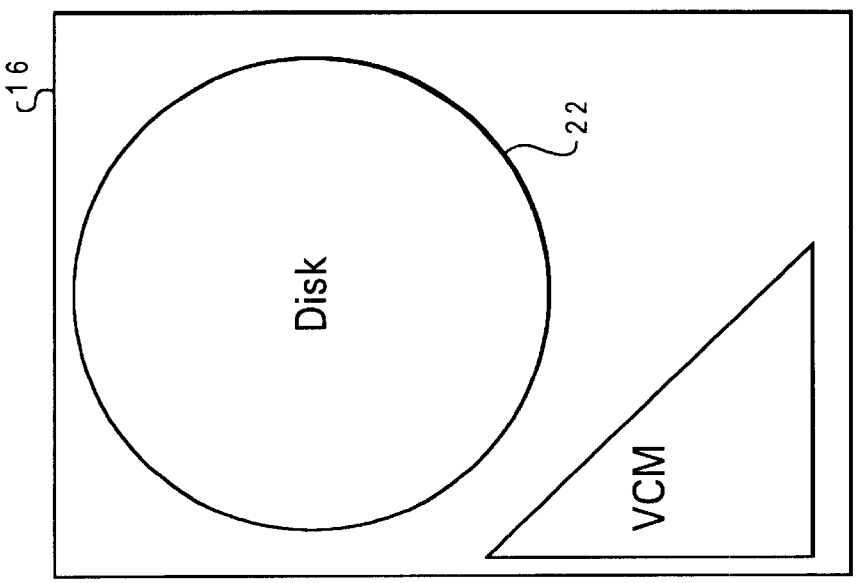
FIGS. 5A and 5B are schematic diagrams of a Hard Disk Drive according to the present embodiment and a conventional Hard Disk Drive.
Figure 5A:
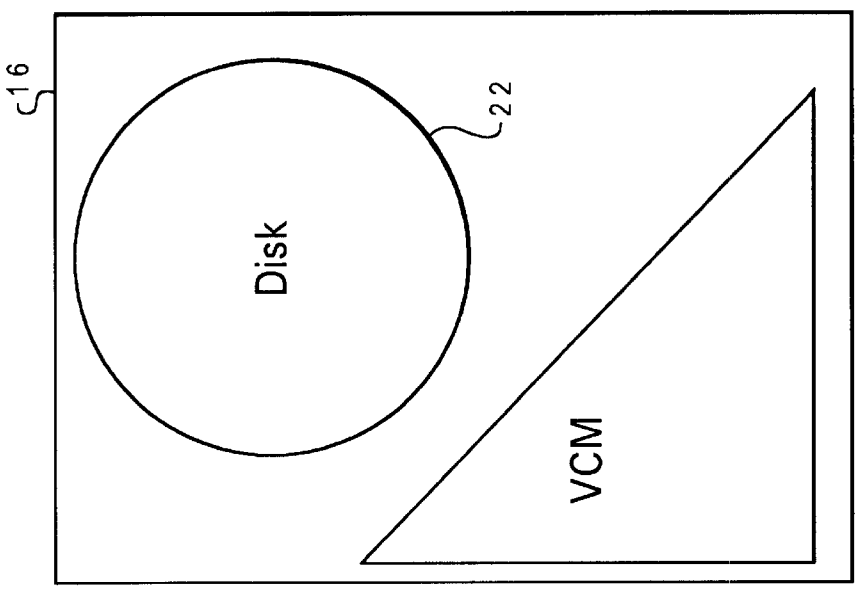

FIGS. 5A and 5B are drawings schematically showing this, and two types of magnetic disks 22 are used in the enclosures 16 having the same form factors. Thus, FIG. 5A shows such an example that the magnetic disk 22 having the dimensions smaller than those of a magnetic disk 22, corresponding to the form factor, is used according to the present invention and is located with the center of the magnetic disk 22 being shifted (deviated) from the center of the enclosure case 16 in the direction of width. On the other hand, FIG. 5B shows such an example that the magnetic disk 22 corresponding to the form factor is used and is located with the center of the magnetic disk 22 coinciding with the center of the enclosure case 16 in the direction of width.

In addition, in Hard Disk Drives available in current market, a center of a magnetic disk 22 in each Hard Disk Drive using a magnetic disk 22 corresponding to its form factor coincides with a center of each enclosure case 16 in the direction of width like the Hard Disk Drive shown in FIG. 5B. This is because both centers coincide with each other due to approximation of an outer diameter of each magnetic disk 22 to the width of each enclosure case 16.

It is apparent from comparison of FIGS. 5A and B that it is possible to enlarge a VCM by reducing the outer diameter of the magnetic disk 22 and further shifting the magnetic disk 22. In addition, although such an example that the distance L between the shaft center of the pivot 30 and the farthest end portion of the voice coil 32 is enlarged is shown as a concrete example of enlarging the VCM, the present invention is not limited to this.

Figure 4:
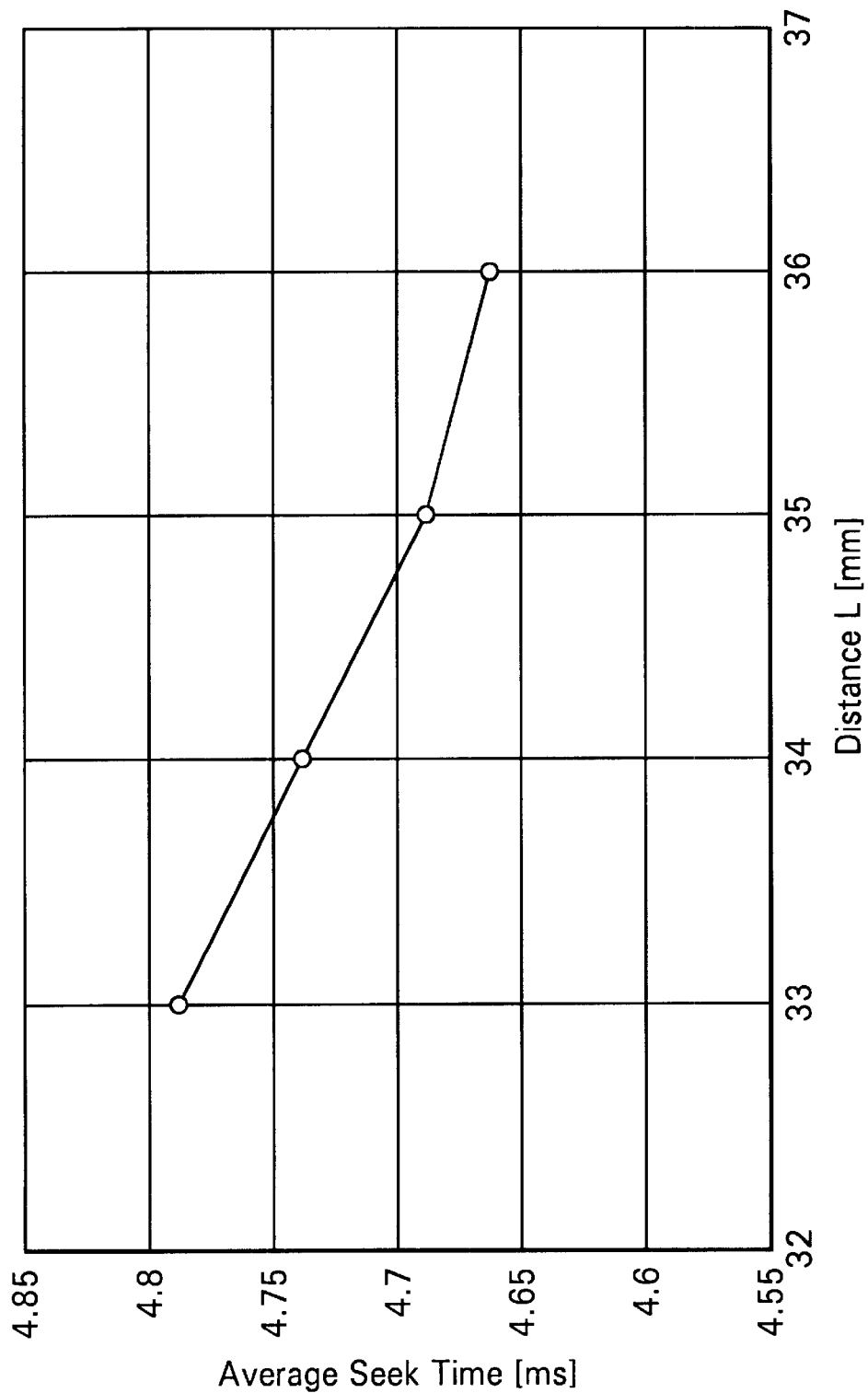
FIG. 4 is a graph showing the relation between the distance from a rotation center to a farthest end portion of a voice coil 32 and the average seek time, according to the present embodiment.

FIG. 4 is a graph showing the result of simulating the variation of average seek time in case of changing the distance L. It is comprehensive from the graph that it is possible to reduce the average seek time by 1 ms or more by elongating the distance L by 3 mm. Owing to this reduction of the seek time, it is achieved to accelerate data read/write.

Figure 6A:
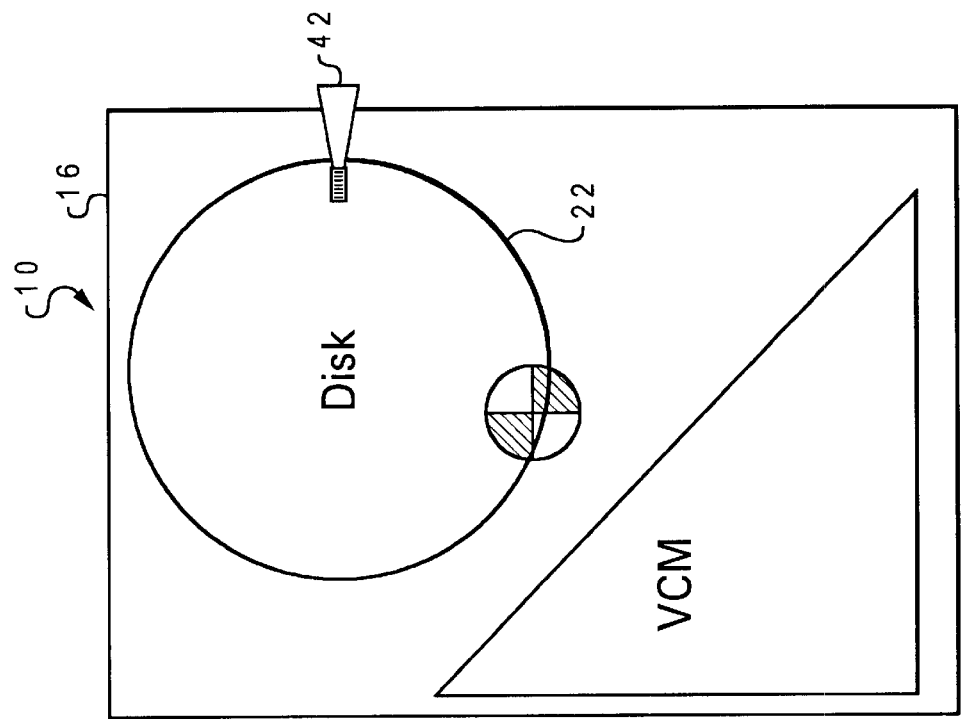
FIGS. 6A and 6B are schematic diagrams of a Hard Disk Drive according to the present embodiment and a Hard Disk Drive for comparison.
Figure 6B:
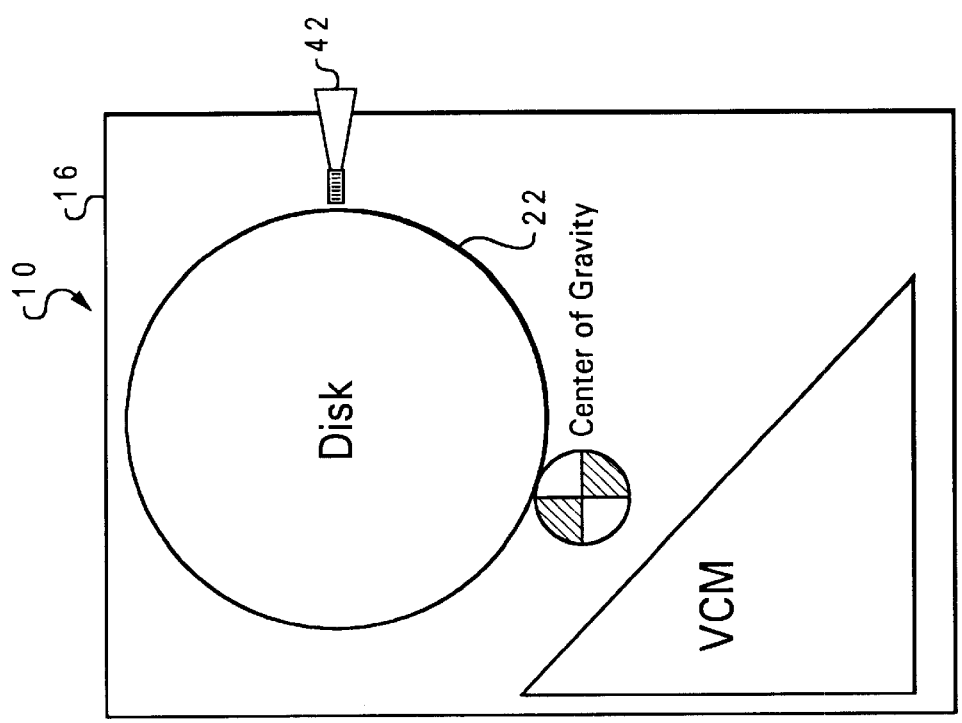

Next, FIGS. 6A and 6B show such examples that two types of magnetic disks 22 are used in the enclosures 16 having the same form factors. Thus, FIG. 6A shows such an example that the magnetic disk 22 having the dimensions smaller than those of a magnetic disk 22, corresponding to the form factor, is used according to the present invention and is located with the center of the magnetic disk 22 being shifted (deviated) from the center of the enclosure case 16 in the direction of width.

On the other hand, FIG. 6B shows such a comparative example that the magnetic disk 22 having the dimensions smaller than those of a magnetic disk 22, corresponding to the form factor, is used but is located with the center of the magnetic disk 22 coinciding with the center of the enclosure case 16 in the direction of width.

The center of gravity of each Hard Disk Drive 10 is shown in FIGS. 6A and 6B. By the way, the magnetic disk 22 (including the spindle motor 18) and VCM occupy a large rate in the weight of the Hard Disk Drive 10. Therefore, positions of the magnetic disk 22 and VCM greatly affect the position of the center of gravity of the Hard Disk Drive 10. On the other hand, it is desirable in the Hard Disk Drive 10 that the center of gravity coincides with the center of the enclosure case 16. This is because the coincidence can reduce vibration relating to the rotation of the magnetic disk 22.

In regard to the Hard Disk Drive 10 according to the present embodiment that is shown in FIG. 6A, since the magnetic disk 22 is shifted and hence gets closer to an upper right corner of the enclosure case 16, the center of gravity of the Hard Disk Drive 10 can coincide with or get closer to the center of the enclosure case 16.

On the other hand, in regard to the Hard Disk Drive 10 shown in FIG. 6B, since the magnetic disk 22 is located so that the center of the magnetic disk 22 may coincide with the center of the enclosure case 16 in the direction of width, the center of gravity of the Hard Disk Drive 10 is eccentrically positioned with being shifted in the left side of the enclosure case 16. Therefore, the vibration of the Hard Disk Drive 10 shown in FIG. 6A is smaller than that of the Hard Disk Drive 10 shown in FIG. 6B.

Next, in FIGS. 6A and 6B, numeral 42 represents a clock head. This clock head 42 is a magnetic head for writing servo tracks on the magnetic disk 22 when the Hard Disk Drive 10 is manufactured. Usually, this clock head 42 writes servo tracks on the magnetic disk 22 with being inserted through a through hole bored in a side wall of the enclosure case 16. When writing the servo tracks, the clock head 42 can access closer to the magnetic disk 22 as the magnetic disk 22 gets closer to the side wall of the enclosure case 16. Thus, as shown in the present embodiment shown in FIG. 6A, it becomes possible to make the magnetic disk 22 get closer to the side wall of the enclosure case 16 by shifting the center of the magnetic disk 22 from the center of the enclosure case 16. Therefore, it becomes easy for the clock head 42 to write the servo tracks.

Although the present embodiment is described above with a form factor of 3.5 inches and the outer diameter of the magnetic disk 22 is 84 mm, the present invention is not limited to this. The present invention can be applied to an enclosure case having another form factor and a magnetic disk having another outer diameter in line with the present invention.

What is claimed is:

1. A hard disk drive, comprising:
    a magnetic disk to record data thereon;
    a head to read data from and write data to the magnetic disk;
    a voice coil motor to drive the head;
    an enclosure case to contain the magnetic disk, the head, and the voice coil motor, the enclosure case having a 3.5 inch form factor, and a center of the magnetic disk being offset from a longitudinal center of the enclosure case in a width direction in a range of approximately 1 to 5 mm, and wherein an outer diameter of the magnetic disk is approximately 84 mm, which is smaller than that corresponding to a form factor of the enclosure case.

2. The hard disk drive according to claim 1, wherein a distance between a rotational center of the voice coil motor and an end portion of a voice coil is in the range of approximately 34 to 37 mm, the distance being greater than that corresponding to a form factor of the enclosure case.

3. The hard disk drive according to claim 1, wherein a center of gravity of the hard disk drive is closer to a center of gravity of the enclosure case than that corresponding to a form factor of the enclosure case.

4. The hard disk drive according to claim 1, wherein a rated rotational speed of the magnetic disk is in a range of in excess of 10,000 rpm to 12,000 rpm, and wherein a clock head mounted to the enclosure case has a proximity to the disk that is smaller than that corresponding to the form factor of the enclosure case.

5. A hard disk drive, comprising:
    a magnetic disk to record data thereon;
    a head to read or write data from or to the magnetic disk;
    a voice coil motor to drive the head, the voice coil motor having a rotational center, an end portion; and
    an enclosure case to contain the magnetic disk, the head, and the voice coil motor, wherein:
    a center of the magnetic disk is offset from a longitudinal center line of the enclosure case in a range of 1 to 5 mm;
    the magnetic disk and the voice coil motor are arranged on a diagonal line of the enclosure case; and
    a center of gravity of the hard disk drive thereby conforms and is closer to a center of a surface of the enclosure case; wherein
    a diameter of the magnetic disk is smaller than that corresponding to a form factor of the enclosure case; wherein
    a length of the voice coil motor between the rotational center and the end portion that is greater than that corresponding to the form factor of the enclosure case, the length being in the range of 34 to 37 mm; and wherein
    a clock head mounted to the enclosure case has a proximity to the disk that is smaller than that corresponding to the form factor of the enclosure case.

* * * * *